US012694030B2

(12) United States Patent
Stapenhurst et al.

(10) Patent No.: US 12,694,030 B2
(45) Date of Patent: Jul. 28, 2026

(54) JOIN OPERATIONS FOR DATASETS WITH INCONSISTENT DIMENSIONS

(71) Applicant: Google LLC, Mountain View, CA (US)

(72) Inventors: Richard Stapenhurst, London (GB); Christopher Thompson-Walsh, London (GB); Alexandru Okros, London (GB); Andrea Ambu, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/835,589

(22) PCT Filed: Jun. 14, 2022

(86) PCT No.: PCT/US2022/072936
§ 371 (c)(1),
(2) Date: Aug. 2, 2024

(87) PCT Pub. No.: WO2023/149965
PCT Pub. Date: Aug. 10, 2023

(65) Prior Publication Data
US 2025/0139100 A1 May 1, 2025

Related U.S. Application Data

(60) Provisional application No. 63/267,634, filed on Feb. 7, 2022.

(51) Int. Cl.
*G06F 15/16* (2006.01)
*G06F 16/21* (2019.01)
(Continued)

(52) U.S. Cl.
CPC ........ *G06F 16/2456* (2019.01); *G06F 16/211* (2019.01); *G06F 16/2452* (2019.01)

(58) Field of Classification Search
None
See application file for complete search history.

(56) References Cited

U.S. PATENT DOCUMENTS

| 10,936,897 B2 | 3/2021 | Vig et al. |
| 2009/0144696 A1* | 6/2009 | Andersen .............. G06F 16/289 |
| | | 717/109 |

(Continued)

FOREIGN PATENT DOCUMENTS

| JP | 2016080413 A1 | 4/2017 |
| JP | 2020095713 A | 6/2020 |

OTHER PUBLICATIONS

Response to Communication Pursuant to Rules 161(1) and 162 EPC dated Aug. 9, 2024, from counterpart European Application No. 22741675.7, filed Jan. 30, 2025, 22 pp.

(Continued)

*Primary Examiner* — Alex Gofman
(74) *Attorney, Agent, or Firm* — Shumaker & Sieffert, P.A.

(57) ABSTRACT

A database system comprising an interface and a processor may perform techniques described in this disclosure. The interface may receive a query for accessing a first dataset and a second dataset, where the query identifies multiple dimensions of the first dataset and the second dataset. The first dataset may include a first dimension, and the second dataset may include a second dimension, but excludes the first dimension. The processor may translate the query into a structured query that conforms to a database query language, where the structured query defines a join between the first dataset and the second dataset over the second dimension. The processor may also transmit the structured query to a database, and receive, responsive to the structured query, an indication that a virtual table was created that (Continued)

```
                                                    ┌─500
┌─────────────────────────────────────────────────────┐
│  RECEIVE QUERY TO FOR ACCESSING AT LEAST SOME PORTION OF │
│  A FIRST DATASET AND AT LEAST SOME PORTION OF A SECOND │
│                      DATASET                         │
└─────────────────────────────────────────────────────┘
                          │
                          ▼                     ┌─502
┌─────────────────────────────────────────────────────┐
│      TRANSLATE THE QUERY INTO A STRUCTURED QUERY THAT │
│         CONFORMS TO A DATABASE QUERY LANGUAGE        │
└─────────────────────────────────────────────────────┘
                          │
                          ▼                     ┌─504
┌─────────────────────────────────────────────────────┐
│         OUTPUT STRUCTURED QUERY TO DATABASE SERVER   │
└─────────────────────────────────────────────────────┘
                          │
                          ▼                     ┌─506
┌─────────────────────────────────────────────────────┐
│   RECEIVE INDICATION THAT A VIRTUAL TABLE WAS CREATED THAT │
│  COMBINES THE FIRST DATASET AND THE SECOND DATASET OVER │
│        THE SECOND DIMENSION OF THE SECOND DATASET    │
└─────────────────────────────────────────────────────┘
``` combines the first dataset and the second dataset over the second dimension of the second dataset.

17 Claims, 5 Drawing Sheets

(51) Int. Cl.
  *G06F 16/2452*      (2019.01)
  *G06F 16/2455*      (2019.01)

(56)                  References Cited

U.S. PATENT DOCUMENTS

| | | | |
|---|---|---|---|
| 2015/0363435 A1 | 12/2015 | Ott et al. | |
| 2018/0218044 A1* | 8/2018 | Wong | G06F 16/2282 |
| 2020/0272651 A1* | 8/2020 | Luo | G06F 16/212 |
| 2021/0191936 A1 | 6/2021 | Khorasani et al. | |

OTHER PUBLICATIONS

"Work with Physical Tables", Oracle help center, Nov. 30, 2021, 9 pp.

Anonymous et al., "How to join tables automatically in dbForge Studio for SQL Server", dbForge Studio for SQL Server, Aug. 2021, 1 pp., Retrieved from the Internet on Oct. 14, 2022 from URL: https://web.archive.org/web/20210806001502/https://docs.devart.com/studio-for-sql-server/building-queries-with-query-builder/joining-tables-automatically.html.

Chattopadhyah et al., "Procella: Unifying serving and analytical data at YouTube", 2019, 13 pp., (Applicant points out, in accordance with MPEP 609.04(a), that the year of publication, 2019, is sufficiently earlier than the effective U.S. filing date, so that the particular month of publication is not an issue.).

International Search Report and Written Opinion of International Application No. PCT/US2022/072936 dated Oct. 21, 2022, 14 pp.

Wikipedia, "Join (SQL)", Dec. 2021, 14 pp., Retrieved from the Internet on Oct. 14, 2022 from URL: https://en.wikipedia.org/w/index.php?title=Join_(SQL)&oldid=1059118171.

First Office Action and Search Report, and translation thereof, from counterpart Indian Application No. 202447059573 dated Aug. 25, 2025, 8 pp.

Notification of Reason for Refusal, and translation thereof, from counterpart Japanese Application No. 2024-546453 dated Sep. 8, 2025, 9 pp.

Response to Office Action dated Sep. 16, 2025, from counterpart Japanese Application No. 2024-546453 filed Dec. 15, 2025, 16 pp.

Decision of Rejection, and translation thereof, from counterpart Japanese Application No. 2024-546453 dated Mar. 3, 2026, 6 pp.

Response to Office Action dated Aug. 25, 2025, from counterpart Indian Application No. 202447059573 filed Jan. 19, 2026, 16 pp.

"SQL Anywhere® Server SQL Usage", Sybase iAnywhere, iAnywhere Solutions, Inc., Mar. 2007, 888 pp., URL: https://infocenter.sybase.com/help/topic/com.sybase.dbugen_1001/pdf/dbugen10.pdf.

Communication pursuant to Article 94(3) EPC from counterpart European Application No. 22741675.7 dated Mar. 30, 2026, 9 pp.

* cited by examiner

307A

| APP | COUNTRY | USER_COUNT |
|---|---|---|
| UT | USD | 10 |
| UT | UK | 5 |
| DRIVE | USD | 200 |

307N

| COUNTRY | ECOSYSTEM_USER_COUNT |
|---|---|
| UK | 5 |
| US | 208 |

309

| APP | COUNTRY | PERCENTAGE OF USERS |
|---|---|---|
| UT | USD | 4.8% (10/208) |
| UT | UK | 100% (5/5) |
| DRIVE | USD | 96.1% (200/208) |

407A

| APP | IS_TESTING_USER | USER_COUNT |
|-----|-----------------|------------|
| UT | FALSE | 3 |
| UT | TRUE | 7 |
| DRIVE | FALSE | 20 |

407N

| APP | IS_TESTING_DEVICE | CRASH_COUNT |
|-----|-------------------|-------------|
| UT | FALSE | 6 |
| UT | TRUE | 3 |
| DRIVE | FALSE | 50 |

409

| APP | NON-TESTING CRASHES PER USER |
|-----|------------------------------|
| UT | 2 (6/3) |
| DRIVE | 2.5 (50/20) |

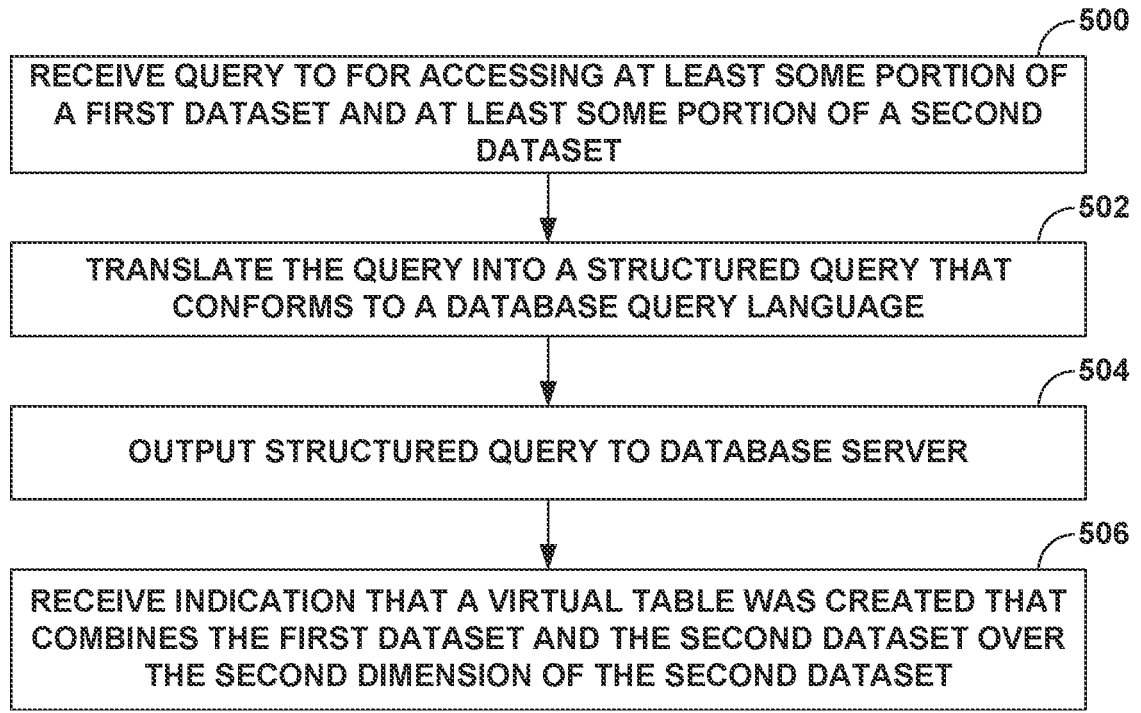

RECEIVE QUERY TO FOR ACCESSING AT LEAST SOME PORTION OF A FIRST DATASET AND AT LEAST SOME PORTION OF A SECOND DATASET

500

TRANSLATE THE QUERY INTO A STRUCTURED QUERY THAT CONFORMS TO A DATABASE QUERY LANGUAGE

502

OUTPUT STRUCTURED QUERY TO DATABASE SERVER

504

RECEIVE INDICATION THAT A VIRTUAL TABLE WAS CREATED THAT COMBINES THE FIRST DATASET AND THE SECOND DATASET OVER THE SECOND DIMENSION OF THE SECOND DATASET

JOIN OPERATIONS FOR DATASETS WITH INCONSISTENT DIMENSIONS

This application claims the benefit of U.S. provisional application No. 63/267,634, entitled "JOIN OPERATIONS FOR DATASETS WITH INCONSISTENT DIMENSIONS," filed Feb. 7, 2022, the entire contents of which are incorporated herein by reference.

BACKGROUND

Formal database languages, such as structured query language (SQL), SQLite, PostgreSQL, Oracle SQL, etc., define syntax and semantics associated with defining, editing, and otherwise managing datasets stored to databases. SQL may, as one example, represent a domain-specific language used in programming and designed for managing datasets held in relational database management systems (RDBMSes). There are numerous commands supported by the syntax, which may invoke functions for performing various operations with respect to the datasets. One such command, referred to as a JOIN command, may be used to form a clause by which to combine rows from two or more datasets, based on a related column between them.

According to the syntax of this formal database language, the JOIN command may require "consistent" dimensions in that all of the multiple datasets referenced by the JOIN command must include a common column. In the event any one of the datasets referenced in the JOIN command does not include the underlying column, the JOIN command fails, due to "inconsistent dimensionality" between the datasets. Such JOIN commands of datasets having inconsistent dimensions may result in inconsistencies, which the strict syntax of the formal database languages may reject. While inconsistent dimensionality, and other such inconsistencies in database management, between the datasets may be necessary to avoid, there may be some instances where the "inconsistent dimensionality" and corresponding JOIN commands between inconsistent datasets may result in aggregate data that is useful.

SUMMARY

Various aspects of the techniques are directed to enabling database management systems to perform JOIN operations over multiple datasets with inconsistent dimensions. A first dataset of the multiple datasets may share one or more columns in common with a second dataset of the multiple datasets, but the JOIN operation may specify certain columns that are not shared or, in other words, common between the first dataset and the second dataset. To overcome the inconsistent dimensionality between the first dataset and the second dataset, a frontend server may translate the JOIN operation into a formal structured database JOIN based on metadata that indicates a compatibility between columns of the second dataset that are only present in the first dataset. The frontend server may then ignore the compatible dimensions specified by the metadata for the second dataset and form the JOIN command over the common (or, in other words, consistent) columns between the first dataset and the second dataset. In this respect, the frontend server may form implicit JOIN operations over datasets with inconsistent dimensions.

The frontend server may define the JOIN operations as one or more JOIN commands that conform to a database query language, such as a structured query language (SQL). The JOIN operations may originally be received via a high level syntax that facilitates readability and that does not adhere to any structured database query language (in terms of syntax and semantics). The frontend server may perform this translation of the high level JOIN operation to one or more JOIN commands that conform to the formal database query language on behalf of a user that may be unfamiliar with database query languages. The frontend server may then transmit these JOIN commands, some of which may identify JOINs over datasets having inconsistent dimensions to facilitate review of aggregate data across two or more datasets.

In this respect, rather than return an error when attempting to perform JOINs over datasets with inconsistent dimensions, the database management system may form such implicit JOIN commands that are configured to actively refrain from specifying certain compatible columns between datasets with inconsistent dimensions. While the result of such JOIN commands over datasets with inconsistent dimensions may return inaccurate aggregate data (e.g., as a result of broadcasting numbers over inconsistent columns that can create extraneous duplicate data), various aspects of the aggregate data may be useful in understanding trends and other aspects related to the aggregate data. Accordingly, the results of such JOIN operations may facilitate further interactions with the aggregate data to expose trends, facilitate data analytics, and otherwise improve understanding of such aggregate data.

Given that such JOIN operations over datasets with inconsistent dimensions were potentially only possible through manual intervention by backend data analytic specialists that would create custom JOIN translation specific to a given use case, various aspects of the techniques may automate JOIN translation over datasets with inconsistent dimensions. Rather than generate an error when such JOIN operations over datasets with inconsistent dimensions were attempted to be translated, potentially resulting in the user entering the JOIN operations to repeatedly attempt to enable the JOIN operations over datasets with inconsistent dimensions, various aspects of the techniques may improve the operation of database management systems themselves in terms of resource consumption (e.g., processor cycles, memory, memory bandwidth, etc. as well as associated power) as a result of avoiding unnecessary error generation. Through this automation, various aspects of the techniques described in this disclosure may facilitate more seamless integration of JOIN operations that do not require extensive manual intervention and code fragmentation, thereby possibly improving development of database management systems themselves.

In one example, various aspects of the techniques are directed to a database system comprising: an interface configured to receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; and one or more processors configured to: translate the query into one or more structured queries that each conforms to a database query language, wherein a structured query of the one or more structured queries defines a join between the first dataset and the second dataset over the second dimension of the second dataset, transmit the structured query to a database that stores the first dataset and the second dataset; and receive, responsive to the structured query, an indication that a virtual table was created that combines the first dataset and the second dataset over the second dimension of the second dataset.

In another example, various aspects of the techniques are directed to a method comprising: receiving a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; translating the query into one or more structured queries that each conforms to a database query language, wherein a structured query of the one or more structured queries defines a join between the first dataset and the second dataset over the second dimension of the second dataset; transmitting the structured query to a database that stores the first dataset and the second dataset; and receiving, responsive to the structured query, an indication that a virtual table was created that combines the first dataset and the second dataset over the second dimension of the second dataset.

In another example, various aspects of the techniques are directed to a non-transitory computer-readable storage media having stored thereon instructions that, when executed, cause one or more processors to: receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; translate the query into one or more structured queries that each conforms to a database query language, wherein a structured query of the one or more structured queries defines a join between the first dataset and the second dataset over the second dimension of the second dataset; transmit the structured query to a database that stores the first dataset and the second dataset; and receive, responsive to the structured query, an indication that a virtual table was created that combines the first dataset and the second dataset over the second dimension of the second dataset.

In another example, various aspects of the techniques are directed to an apparatus comprising: means for receiving a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; means for translating the query into one or more structured queries that each conforms to a database query language, wherein a structured query of the one or more structured queries defines a join between the first dataset and the second dataset over the second dimension of the second dataset; means for transmitting the structured query to a database that stores the first dataset and the second dataset; and means for receiving, responsive to the structured query, an indication that a virtual table was created that combines the first dataset and the second dataset over the second dimension of the second dataset.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flowchart illustrating example operation of the database management system of FIG. 1 in performing various aspects of the implicit JOIN techniques described in this disclosure.

DETAILED DESCRIPTION

Figure 1:
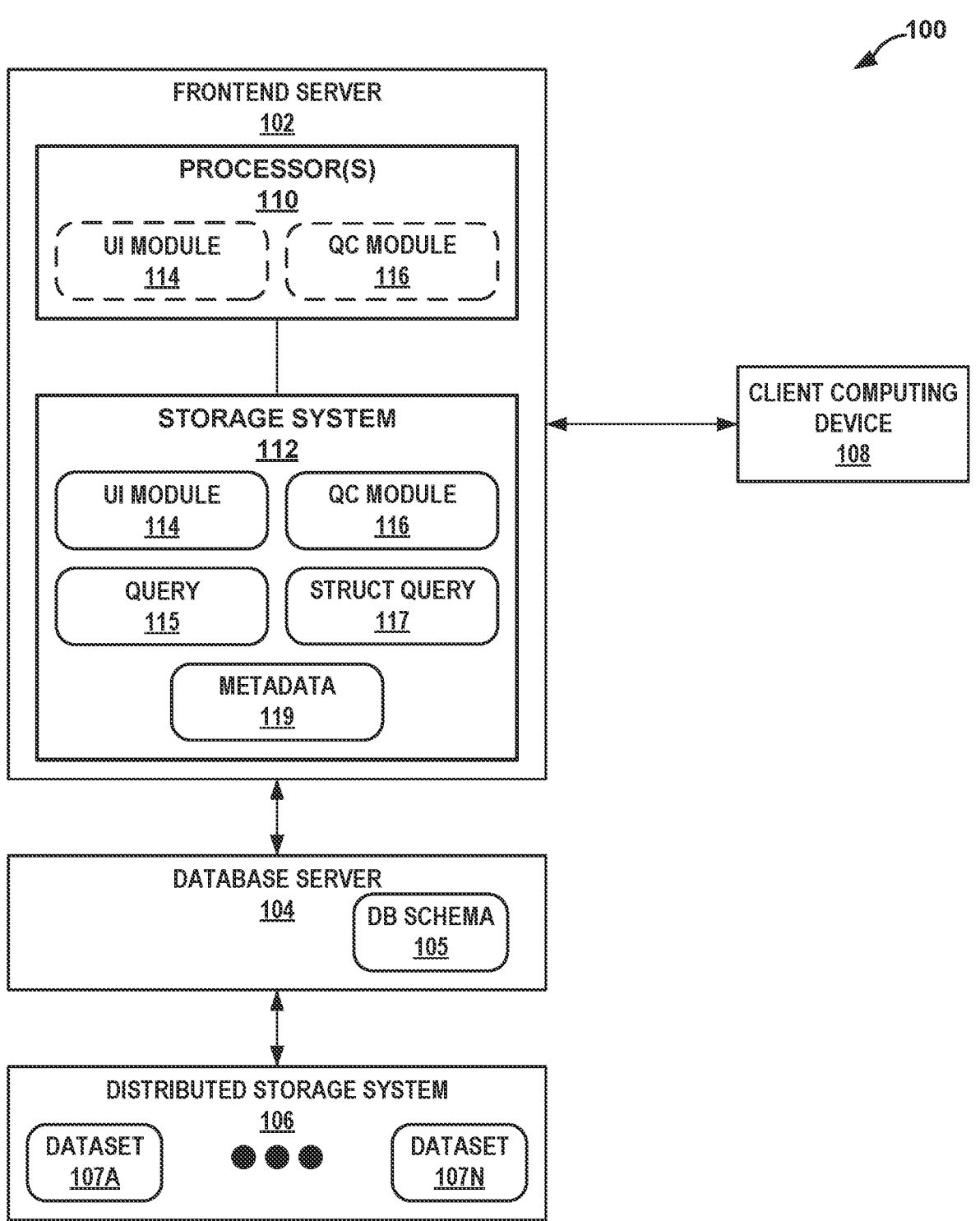
FIG. 1 is a diagram illustrating an example database management system configured to perform various aspects of the implicit JOIN techniques described in this disclosure.

Data aggregation and analytics is increasingly allowing for detailed understanding of trends, user actions, etc. that allow for more informed decision making. The aggregation of data occurs via database management systems, which may define a database schema for how various datasets (such as tables, including multi-dimensional tables referred to a hypercubes or online analytical processing—OLAP—cubes) relate to one another within the overall database. Increasingly, data is being aggregated and stored in near real-time to databases to facilitate on demand data analytics to expose trends that may promote such decision making.

The database management system (which may also be referred to as a "database system") may provide a frontend server to facilitate interactions with clients so that the clients may engage in data analytics with respect to the aggregated data stored to the databases. For example, an application developer (which may also be referred to as an "app developer") may review data related to a distributed application ("app") to understand net sales per country, state, or other jurisdiction, revenue per currency, number of active users, etc. The app developer may not be familiar with the formal database query language, such as a structured query language (SQL), and the frontend server may expose a high level syntax for performing data analytics that removes some of the formalities associated with formal database query languages.

The app developer or other client may interface with the frontend server to define various queries according to the high-level syntax. The frontend server may then translate (or, in other words, compile) the queries into one or more queries that conform to the formal database query language. Formal database languages, such as structured query language (SQL), SQLite, PostgreSQL, Oracle SQL, etc., define syntax and semantics associated with defining, editing, and otherwise managing datasets stored to databases. SQL may, as one example, represent a domain-specific language used in programming and designed for managing datasets held in relational database management systems (RDBMSes). There are numerous commands supported by the syntax, which may invoke functions for performing various operations with respect to the datasets. One such command, referred to as a JOIN command, may be used to form a clause by which to combine rows from two or more datasets, based on a related column between them.

According to the syntax of this formal database language, the JOIN command may require "consistent" dimensions in that all of the multiple datasets referenced by the JOIN command must include a common column. In the event any one of the datasets referenced in the JOIN command does not include the underlying column, the JOIN command fails due to what may be referred to as "inconsistent dimensionality" between the datasets as such JOIN commands may result in errors that the strict syntax of the formal database languages enforce. While inconsistent dimensionality between the datasets may be necessary to avoid such errors in dataset management, there may be some instances where such JOIN commands between inconsistent datasets may result in aggregate data that is useful.

In accordance with various aspects of the techniques described in this disclosure, a database management system may perform JOIN operations over multiple datasets with inconsistent dimensions. A first dataset of the multiple datasets may share one or more columns in common with a second dataset of the multiple datasets, but the JOIN operation may specify certain columns that are not shared or, in other words, common between the first dataset and the second dataset. To overcome the inconsistent dimensionality between the first dataset and the second dataset, the frontend server may translate the JOIN operation into a formal structured database JOIN based on metadata that indicates a compatibility between columns of the second dataset that are only present in the first dataset. The frontend server may then ignore the compatible dimensions specified by the metadata for the second dataset and form the JOIN command over the common (or, in other words, consistent) columns between the first dataset and the second dataset. In this respect, the frontend server may form implicit JOIN operations over datasets with inconsistent dimensions.

The frontend server may define the JOIN operations as one or more JOIN commands that conform to a database query language, such as a structured query language (SQL). The JOIN operations may originally be received via a high level syntax that facilitates readability and that does not adhere to any structured database query language (in terms of syntax and semantics). The frontend server may perform this translation of the high level JOIN operation to one or more JOIN commands that conform to the formal database query language on behalf of a user that may be unfamiliar with database query languages. The frontend server may then transmit these JOIN commands, some of which may identify JOINs over datasets having inconsistent dimensions to facilitate review of aggregate data across two or more datasets.

In this respect, rather than return an error when attempting to perform JOINs over datasets with inconsistent dimensions, the database management system may form such implicit JOIN commands that are configured to actively refrain from specifying certain compatible columns between datasets with inconsistent dimensions. While the result of such JOIN commands over datasets with inconsistent dimensions may return inaccurate aggregate data (e.g., as a result of broadcasting numbers over inconsistent columns that can create extraneous duplicate data), various aspects of the aggregate data may be useful in understanding trends and other aspects related to the aggregate data. Accordingly, the results of such JOIN operations may facilitate further interactions with the aggregate data to expose trends, facilitate data analytics, and otherwise improve understanding of such aggregate data.

Given that such JOIN operations over datasets with inconsistent dimensions were potentially only possible through manual intervention by backend data analytic specialists that would create custom JOIN translation specific to a given use case, various aspects of the techniques may automate JOIN translation over datasets with inconsistent dimensions. Rather than generate an error when such JOIN operations over datasets with inconsistent dimensions were attempted to be translated, potentially resulting in the user entering the JOIN operations to repeatedly attempt to enable the JOIN operations over datasets with inconsistent dimensions, various aspects of the techniques may improve the operation of database management systems themselves in terms of resource consumption (e.g., processor cycles, memory, memory bandwidth, etc. as well as associated power) as a result of avoiding unnecessary error generation. Through this automation, various aspects of the techniques described in this disclosure may facilitate more seamless integration of JOIN operations that do not require extensive manual intervention and code fragmentation, thereby possibly improving development of database management systems themselves.

FIG. 1 is a diagram illustrating an example database management system 100 configured to perform various aspects of the implicit JOIN techniques described in this disclosure. As shown in the example of FIG. 1, database management system 100 (which may also be referred to as a "database system 100") may include a frontend server 102, a database server 104, a distributed storage system 106, and a client computing device 108.

Frontend server 102 may represent a server configured to host an interface with which client computing device 108 may interact to define one or more queries and ultimately view data (or data derived from the data) stored as datasets to distributed storage system 106 under management by database server 104. Frontend server 102 may include one or more processors 110 and a storage system 112.

One or more processors 110 may implement functionality and/or execute instructions associated with frontend server 102. Examples of processors 110 include application processors, microcontrollers, central processing units (CPUs), field programmable gate arrays (FPGAs), application specific integrated circuits (ASICs), graphics processing units (GPUs), display controllers, auxiliary processors, one or more sensor hubs, and any other hardware configure to function as a processor, a processing unit, or a processing device. Modules 114-116 may be operable (or, in other words, executed) by processors 110 to perform various actions, operations, or functions of frontend server 102. That is, modules 114-116 may form executable bytecode, which when executed, cause processors 110 to perform specific operations (and thereby causing frontend server 102 to become a specific-purpose computer by which to perform) in accordance with various aspects of the techniques described herein. For example, processors 110 of frontend server 102 may retrieve and execute instructions stored by storage system 112 that cause processors 110 to perform the operations described herein that are attributed to modules 114-116. The instructions, when executed by processors 110, may cause frontend server 102 to store information within storage system 112.

Storage system 112 within frontend server 102 may store information for processing during operation of frontend server 102 (e.g., frontend server 102 may store data accessed by modules 114-116 during execution at frontend server 102). In some examples, storage system 112 is a temporary memory, meaning that a primary purpose of storage system 112 is not long-term storage. Storage system 112 on frontend server 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage system 112, in some examples, also include one or more computer-readable storage media. Storage system 112 may include one or more non-transitory computer-readable storage mediums. Storage system 112 may be configured to store larger amounts of information than typically stored by volatile memory. Storage system 112 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage system 112 may store program instructions and/or information (e.g., data) associated with modules 114-116. Storage system 112 may include a memory configured to store data or other information associated with modules 114-116.

Database server 104 may represent a server that manages datasets 107A-107N ("datasets 107") stored to distributed storage system 106 according to a database schema 105 ("DB schema 105"). Database server 104 specifies DB schema 105 using a formal language and defines relationships between objects stored to the underlying database (which in this instance are referred to as datasets 107). Datasets 107 may represent multi-dimensional tables having multiple rows and columns. In some instances, the multi-dimensional tables may include N-dimensions (where N is equal to or greater than three), in which case the multi-dimensional tables may be referred to as online analytical processing (OLAP) cubes ("OLAP cubes") or "hypercubes" (when N is greater than three).

Distributed storage system 106 may represent a highly scalable system for dynamic distribution and redistribution of storage across a wide variety of databases and workflows. Distributed storage system 106 may include any number of servers, potentially arranged as a cluster that may be geographically dispersed (e.g., across two or more data centers). Distributed storage system 106 may provide a cluster of storage units (which may be the same if not substantially the same as storage system 112 described above with respect to frontend server 102) along with various mechanisms for data synchronization and coordination between cluster nodes.

While described above as including dedicated devices, database management system 100 may include a single database that hosts datasets 107 and presents a frontend interface similar to that described herein with respect to frontend server 102. In this respect, database management system 100 may include one or more servers that implement the functionality attributed to each of frontend server 102, database server 104, and distributed storage system 106. As such, various aspects of the techniques described in this disclosure should not be limited to the example architecture shown in FIG. 1.

Furthermore, although only frontend server 102 is shown as including processors 110 and storage system 112 in the example of FIG. 1, it should be understood that database server 104, distributed storage system 106, and client computing device 108 may each include one or more processors similar to processors 110 and a storage system similar to storage system 112. In addition, each of frontend server 102, database server 104, distributed storage system 106, and client computing device 108 may include additional hardware not shown in the example of FIG. 1, such as display devices, network interface cards (NICs), interface components (e.g., keyboards, mice, etc.), and the like, as well as software, including operating systems (OSes) that present an application space in which various applications or other modules may execute separate from the OSes, database management software (e.g., used to define and visualize DB schema 105), and the like.

As described above, database management system 100 may provide frontend server 102 to facilitate interactions with clients (e.g., by way of client computing device 108) so that the clients may engage in data analytics with respect to the aggregated data stored to the databases within distributed storage system 106. For example, an application developer (which may also be referred to as an "app developer") may review data related to a distributed application ("app") to understand net sales per country, state, or other jurisdiction, revenue per currency, number of active users, etc. The app developer may not be familiar with the formal database query language, such as a structured query language (SQL), and frontend server 102 may expose a high level syntax for performing data analytics that removes some of the formalities associated with formal database query languages.

In the example of FIG. 1, processors 110 of frontend server 102 may be configured to execute a user interface (UI) module 114 that presents an interface accessible by client computing device 108. UI module 114 may represent a web-based interface that enables the client, via client computing device 108, to enter a query 115 that conforms to the high-level syntax for performing data analytics. While described as representing a web-based interface, UI module 114 may present other types of interfaces, including a command line interface (CLI), a graphical user interface ("GUI"), or any other type of interface that facilitates definition of query 115.

The app developer or other client may interface with UI module 114 of frontend server 102 to define various queries, such as query 115, according to the high-level syntax. Responsive to receiving query 115, processors 110 may invoke query compiler (QC) module 116, which may translate (or, in other words, compile) the queries into one or more structured queries, such as structured query 117 ("struct query 117"), that conform to the formal database query language. Formal database languages, such as structured query language (SQL), SQLite, PostgreSQL, Oracle SQL, etc., define syntax and semantics associated with defining, editing, and otherwise managing datasets 107 stored to databases. SQL may, as one example, represent a domain-specific language used in programming and designed for managing datasets held in relational database management systems (RDBMSes). There are numerous commands supported by the syntax, which may invoke functions for performing various operations with respect to datasets 107. One such command, referred to as a JOIN command, may be used to form a clause by which to combine rows from two or more datasets, based on a related column between them.

According to the syntax of this formal database language, the JOIN command may require "consistent" dimensions in that all of multiple datasets 107 referenced by the JOIN command must include a common column. In the event any one of datasets 107 referenced in the JOIN command does not include the underlying column, the JOIN command fails due to what may be referred to as "inconsistent dimensionality" between datasets 107 as such JOIN commands may result in errors that the strict syntax of the formal database languages enforce. While inconsistent dimensionality between datasets 107 may be necessary to avoid such errors in dataset management, there may be some instances where such JOIN commands between inconsistent datasets 107 may result in aggregate data that is useful.

For example, there are a number of metrics that for one reason or another are difficult to formulate due to the underlying dimensionality of datasets 107. Consider a metric concerning buyers per active users, where "buyers" is specified as dataset 107A in which the buyers are specified by tracking period, while the "number of active users" is specified as another dataset 107N and is the same over any tracking period. As such, "active users" dataset 107N does not define a tracking period as a column (because the active users don't change over a tracking period) and therefore lacks common dimensionality with "buyers" dataset 107A. In compiling a request to compile query 115 defining a request for buyers per active users, QC module 116 would encounter a JOIN command between dataset 107A and dataset 107N that selects inconsistent dimensions due to dataset 107N lacking the "tracking period" column. Yet, buyers per active users is a potentially useful metric by which to ascertain trends with regard to product management, app development, etc.

In accordance with various aspects of the techniques described in this disclosure, database management system 100 may perform JOIN operations over multiple datasets 107 with inconsistent dimensions. A first dataset 107A of multiple datasets 107 may share one or more columns in common with a second dataset 107N of multiple datasets 107, but the JOIN operation may specify certain columns that are not shared or, in other words, common between dataset 107A and 107N (as an example). To overcome the inconsistent dimensionality between dataset 107A and dataset 107N, QC module 116 may translate the JOIN operation into a formal structured database JOIN based on metadata 119 that indicates a compatibility between columns of dataset 107N that are only present in dataset 107A. QC module 116 may then refrain from specifying (or, in other words, ignore) the compatible dimensions identified by metadata 119 for dataset 107N and form the JOIN command over the common (or, in other words, consistent) columns between dataset 107A and dataset 107N. In this respect, frontend server 102 may form implicit JOIN operations over datasets 107A/107N with inconsistent dimensions.

QC module 116 may define the JOIN operations as one or more JOIN commands that conform to a database query language, such as a structured query language (SQL). The JOIN operations may originally be received as query 115 via a high level syntax that facilitates readability and that does not adhere to any structure database query language (in terms of syntax and semantics). QC module 116 may perform this translation of the high level JOIN operation to one or more JOIN commands that conform to the formal database query language on behalf of a user that may be unfamiliar with database query languages. QC module 116 may generate these JOIN commands as structured query 117. Frontend server 102 may then transmit these JOIN commands as structured query 117, some of which may identify JOINs over datasets having inconsistent dimensions to facilitate review of aggregate data across two or more datasets 107A/107N.

In operation, QC module 116 may represent an interface (possibly in combination with UI module 114) configured to receive query 115 for accessing at least some portion of dataset 107A and at least some portion of dataset 107N. Query 115 may identify (e.g., as a select) two or more dimensions of datasets 107A and 107N. In the example above, dataset 107A includes a first dimension ("tracking period") of the two or more dimensions identified by query

115, while dataset 107N includes a second dimension ("active users") of the two or more dimensions identified by query 115 and excludes the first dimension of the two or more dimensions identified by query 115.

QC module 114 may translate query 115 into structured query 117 that conforms to a database query language, such as SQL. Structured query 117 may define a JOIN between dataset 107A and 107B over the second dimension of the two or more dimensions identified by query 115 (and not the first inconsistent dimension of the two or more dimensions). Metadata 119 may identify the first dimension of dataset 107A as being compatible with dataset 107N, which authorizes QC module 114 to formulate the JOIN command as structured query 116 while refraining from specifying the first dimension as part of structured query 117. QC module 116 may output or otherwise transmit structured query 117 to database server 104, which may access the underlying database storing datasets 107A and 107B hosted by distributed storage system 106.

The result of structured query 117 may be what is referred to as a "view" in SQL, which may represent a so-called virtual table that is specified as an operation (e.g., JOIN command) and computed in near real-time each time the virtual table is accessed (to reduce storage consumption). Views may be resolved and stored separately to potentially improve access speeds but at the cost of additional storage consumption. In any event, database server 104 may perform the JOIN command set forth by structured query 117 and return an indication that the virtual table was created that combines dataset 107A and dataset 107N over the second dimension of dataset 107N.

In this respect, rather than return an error when attempting to perform JOINs over datasets 107 with inconsistent dimensions, database management system 100 may form such implicit JOIN commands that are configured to actively refrain from specifying certain compatible columns between datasets 107 with inconsistent dimensions. While the result of such JOIN commands over datasets 107 with inconsistent dimensions may return inaccurate aggregate data (e.g., as a result of broadcasting numbers over inconsistent columns that can create extraneous duplicate data), various aspects of the aggregate data may be useful in understanding trends and other aspects related to the aggregate data. Accordingly, the results of such JOIN operations may facilitate further interactions with the aggregate data to expose trends, facilitate data analytics, and otherwise improve understanding of such aggregate data.

Given that such JOIN operations over datasets 107 with inconsistent dimensions were potentially only possible through manual intervention by backend data analytic specialists that would create custom JOIN translation specific to a given use case, various aspects of the techniques may automate JOIN translation over datasets 107 with inconsistent dimensions. Rather than generate an error when such JOIN operations over datasets 107 with inconsistent dimensions were attempted to be translated, potentially resulting in the user entering the JOIN operations to repeatedly attempt to enable the JOIN operations over datasets 107 with inconsistent dimensions, various aspects of the techniques may improve the operation of database management system 100 itself in terms of resource consumption (e.g., processor cycles, memory, memory bandwidth, etc. as well as associated power) as a result of avoiding unnecessary error generation.

Through this automation, various aspects of the techniques described in this disclosure may facilitate more seamless integration of JOIN operations that may not require extensive manual intervention and code fragmentation, thereby possibly improving development of database management system 100 itself. That is, to enable JOIN operations over datasets 107 with inconsistent dimensions, a data analytics specialist would manually implement the JOIN operation and link the JOIN operation to the client, separating automatically compiled JOIN operations from manually defined JOIN operations and thereby fragmenting the code base. In this respect, automating generation of JOIN operations over datasets with inconsistent dimensions may resolve code fragmentation and better integrate query compilation, resulting in possible improvement in development of database management system 100.

Figure 2:
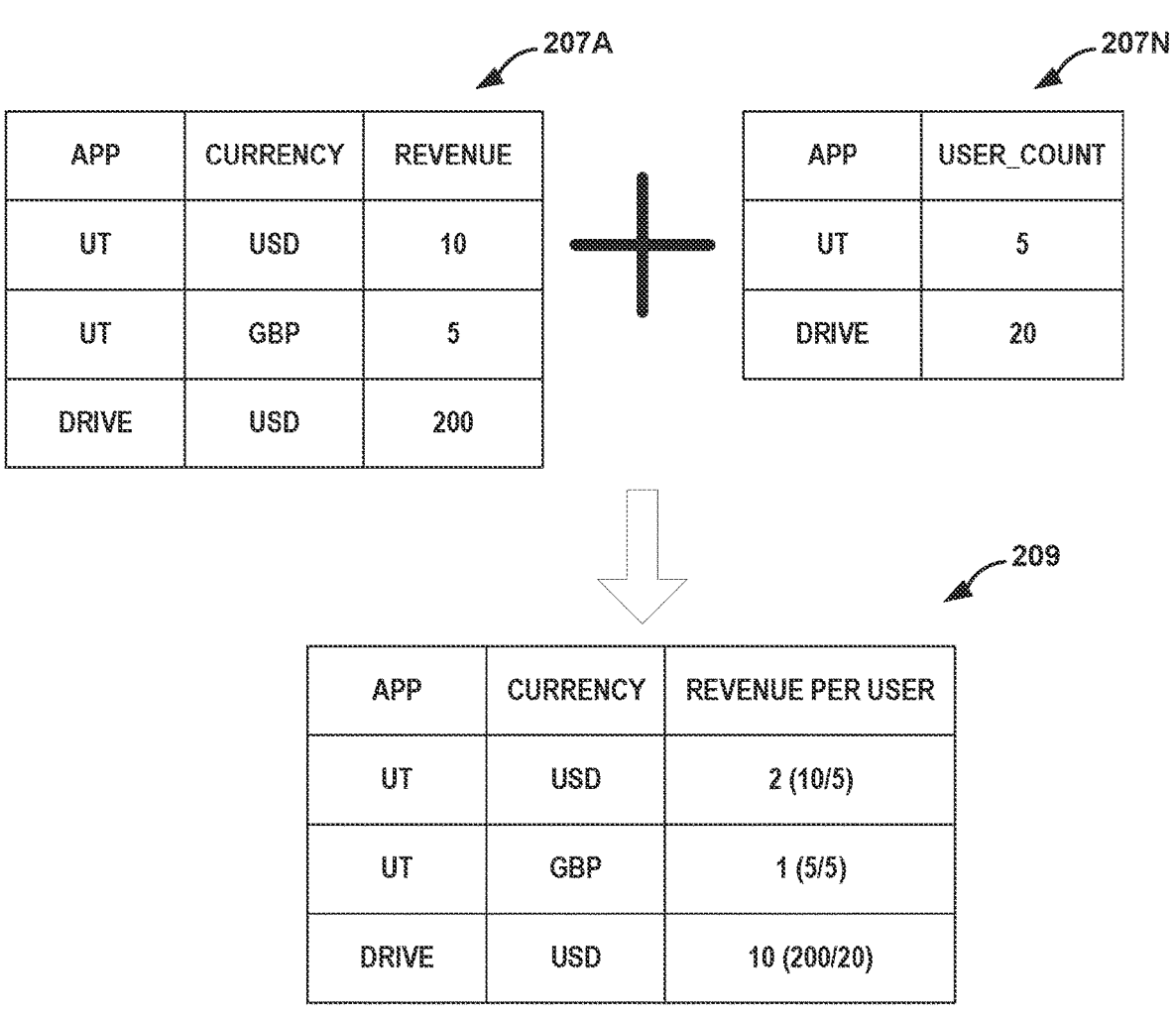
FIGS. 2-4 are diagrams illustrating example JOIN operations performed between datasets having inconsistent dimensions in accordance with various aspects of the techniques described in this disclosure.
Figure 3:
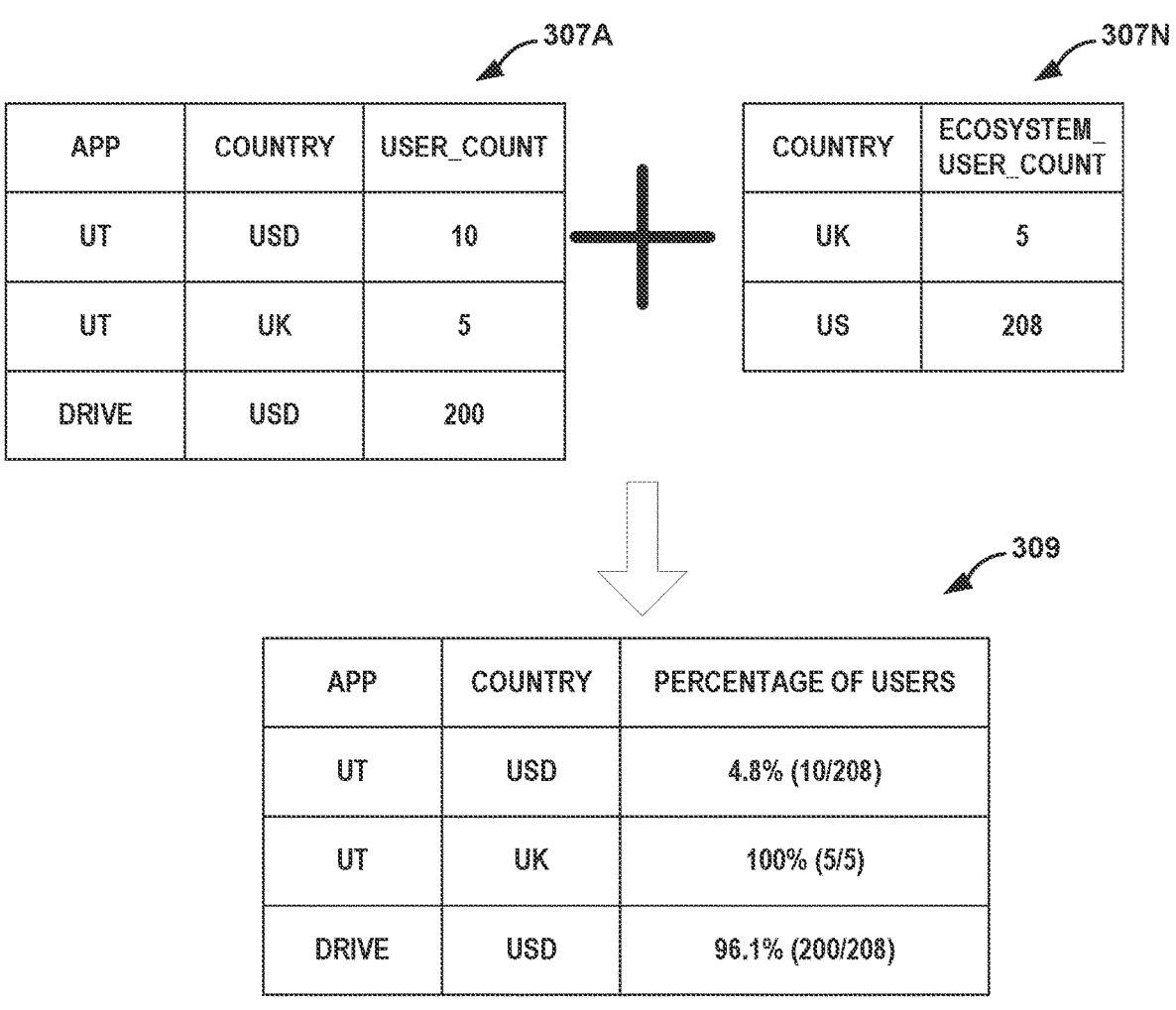
Figure 4:
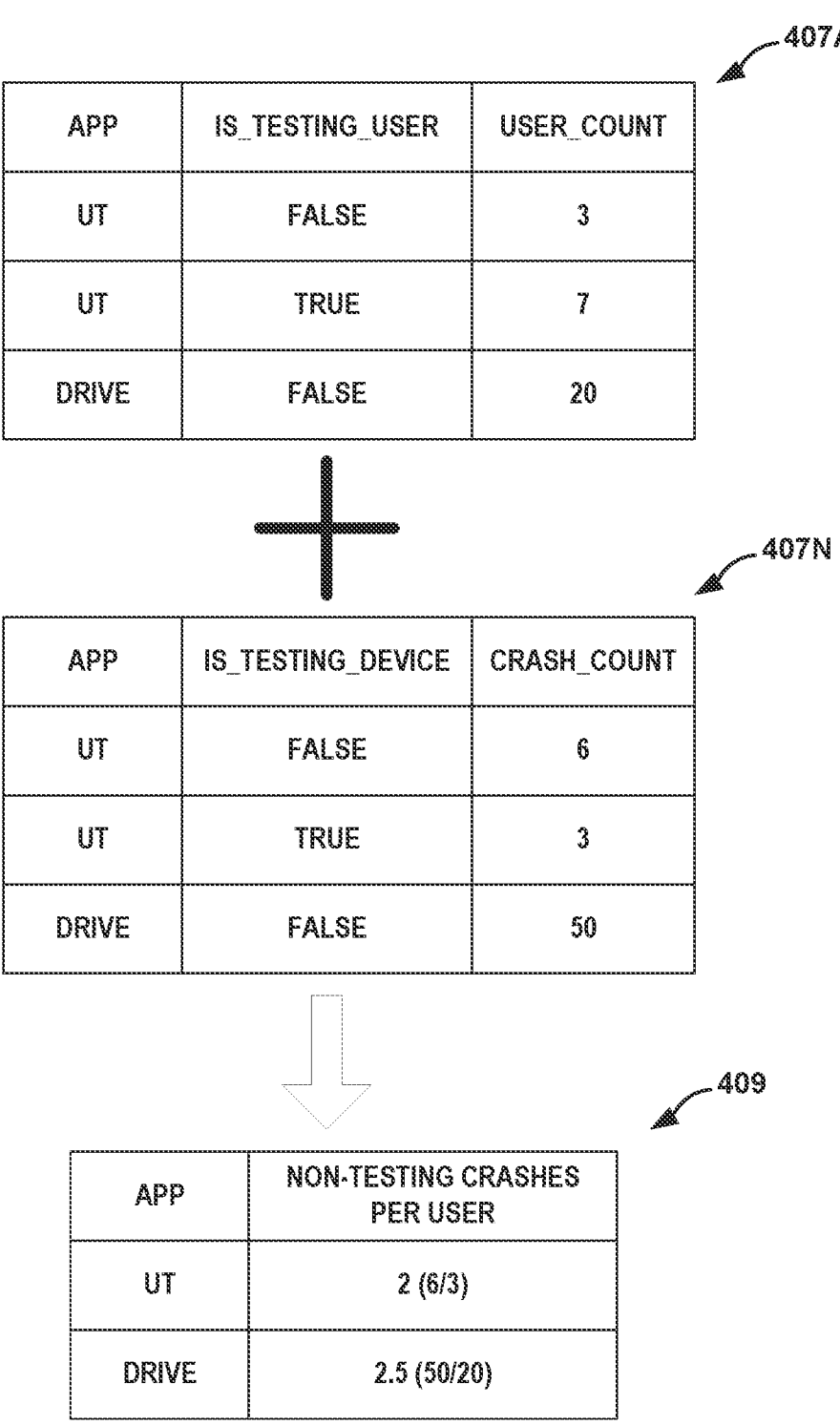

FIGS. 2-4 are diagrams illustrating example JOIN operations performed between datasets having inconsistent dimensions in accordance with various aspects of the techniques described in this disclosure. Referring first to the example of FIG. 2, a dataset 207A is joined with a dataset 207N, both of which may represent examples of datasets 107 shown in the example of FIG. 1. A data analytics specialist and/or a client may define dataset 207A and dataset 207N as follows:

---

Revenue: [app, currency, revenue]
Users: [app, user_count] compatible dimensions: [currency]

---

In this example, dataset 207A is named "Revenue" and has three dimensions denoted as "app," "currency," and "revenue" that each represent a separate column in dataset 207A. Dataset 207N is named "Users" in this example and has two dimensions denoted as "app" and "user_count" that each represent a separate column in dataset 207N. QC module 116 may maintain this information as part of metadata 119 (where the above definition may also be defined in DB schema 105). Metadata 119 stored local to frontend server 102 and maintained by QC module 116 separate from DB schema 105 may further indicate a compatible dimension denoted as "currency" which references the "currency" dimension (or, in other words, column) of "Revenue" dataset 207A.

UI module 114 may receive a query 115 from client computing device 108, where query 115 sets forth the following:

---

SELECT app, currency, SUM(revenue) / SUM(user_count)
FROM virtual_table GROUP BY 1, 2;

---

In this example, query 115 references (using the "SELECT" command) the common "app" dimension from both dataset 207A and dataset 207N, and the inconsistent "currency" dimension, which is included in dataset 207A but excluded from dataset 207N. Responsive to receiving query 115, UI module 114 may invoke QC module 116.

QC module 116 may translate query 115 based on metadata 119 to obtain structured query 117, where structured query 117 may define a JOIN between dataset 207A and dataset 207N over the "app" dimension, excluding the "currency" dimension from the JOIN set forth in structured query 117 below given that metadata 119 indicates that "currency" is a compatible dimension.

---

SELECT app, currency, SUM(revenue) / SUM(user_count)
FROM revenue JOIN users USING(app)
GROUP BY 1, 2;

---

In other words, metadata 119 may identify dataset 207N as having the "currency" dimension of dataset 207A as a compatible dimension with dataset 207N. QC module 116 may analyze the compatible dimensions identified by metadata 119 and refrain from specifying the compatible dimension "currency" of dataset 207A in the JOIN defined by structured query 117.

As noted above, generally a "SELECT" of inconsistent dimensions across two datasets would result in an error. QC module 116 instead "ignores" or, in other words, is configured to refrain from specifying compatible dimensions in JOIN operations between datasets 207A/207N. This results in virtual table 209 having an "app" dimension, a "currency" dimension, and a "revenue per user" dimension as columns of virtual table 209. The "GROUP BY" command followed by ordinal numbers one and two indicate that virtual table 209 is grouping the aggregate results first by "app" and next by "currency."

The "user_count" dimension is broadcast across the ignored "currency" dimension in virtual table 209, which effectively attributes a "user_count" of five to both "currency" types (e.g., USD and GBP) for "app" of type "UT." As such, user_count of "5" is duplicated in rows 2 and 3 of virtual table 209 and totals 30 users when dataset 207N only shows a total of 25 users. To avoid these types of inconsistencies, database server 104 would return an error, but virtual table 209 still provides aggregate data that may be useful in identifying trends and making decisions.

To avoid overextending this broadcast concept to the point that it may be difficult to follow any inconsistencies introduced, QC module 116 only broadcasts dimensions over "compatible" dimensions specified or otherwise identified by metadata 119. If query 115 were to specify a fourth dimension for dataset 207A that was not indicated as being a compatible dimension for dataset 207N (by metadata 119), QC module 116 may generate and return an error indicating that translation of query 115 cannot be performed. In this way, QC module 116 may limit translation of query 115 to only those instances where compatible dimensions have been clearly defined in metadata 119.

Referring next to the example of FIG. 3, a dataset 307A is joined with a dataset 307N, both of which may represent examples of datasets 107 shown in the example of FIG. 1. A data analytics specialist and/or a client may define dataset 307A and dataset 307N as follows:

---

Users:[app, country, user_count]
Ecosystem_users:[country, ecosystem_user_count] compatible dimensions:
[app]

---

In this example, dataset 307A is named "Users" and has three dimensions denoted as "app," "country," and "user_count" that each represent a separate column in dataset 307A. Dataset 307N is named "Ecosystem_users" in this example and has two dimensions denoted as "country" and "ecosystem_user_count" that each represent a separate column in dataset 307N. QC module 116 may maintain this information as part of metadata 119 (where the above definition may also be defined in DB schema 105). Metadata 119 stored local to frontend server 102 and maintained by QC module 116 separate from DB schema 105 may further indicate a compatible dimension denoted as "app" which references the "app" dimension (or, in other words, column) of "Users" dataset 307A.

UI module 114 may receive a query 115 from client computing device 108, where query 115 sets forth the following:

```
SELECT country, app, SUM(user_count) / SUM(ecosystem_user_count)
FROM virtual_table GROUP BY 1, 2;
```

In this example, query 115 references (using the "SELECT" command) the common "country" dimension from both dataset 307A and dataset 307N, and the inconsistent "app" dimension, which is included in dataset 307A but excluded from dataset 307N. Responsive to receiving query 115, UI module 114 may invoke QC module 116.

QC module 116 may translate query 115 based on metadata 119 to obtain structured query 117, where structured query 117 may define a JOIN between dataset 307A and dataset 307N over the "country" dimension, excluding the "app" dimension from the JOIN set forth in structured query 117 below given that metadata 119 indicates that "app" is a compatible dimension.

```
SELECT country, app, SUM(user_count) / SUM(ecosystem_user_count)
FROM users JOIN ecosystem_users USING(country)
GROUP BY 1, 2;
```

In other words, metadata 119 may identify dataset 307N as having the "app" dimension of dataset 307A as a compatible dimension with dataset 307N. QC module 116 may analyze the compatible dimensions identified by metadata 119 and refrain from specifying the compatible dimension "app" of dataset 307A in the JOIN defined by structured query 117.

As noted above, generally a "SELECT" of inconsistent dimensions across two datasets would result in an error. QC module 116 instead "ignores" or, in other words, is configured to refrain from specifying compatible dimensions in JOIN operations between datasets 307A/307N. This results in a virtual table 309 having an "app" dimension, a "country" dimension, and a "percentage of users" dimension as columns of virtual table 309. The "GROUP BY" command followed by ordinal numbers one and two indicate that virtual table 309 is grouping the aggregate results first by "country" and next by "app."

The "user_count" dimension is broadcast across the ignored "app" dimension in virtual table 309, which effectively attributes a "ecosystem_user_count" of 208 to both "app" types (e.g., UT and Drive) for "country" of type "US." As such, ccosystem_user_count of "208" is duplicated in rows 2 and 4 of virtual table 309 and totals 208 additional users when dataset 307N only shows a total of 213 users. To avoid these types of inconsistencies, database server 104 would return an error, but virtual table 309 still provides aggregate data that may be useful in identifying trends and making decisions.

Again, to avoid overextending this broadcast concept to the point that it may be difficult to follow any inconsistencies introduced, QC module 116 only broadcasts dimensions over "compatible" dimensions specified or otherwise identified by metadata 119. If query 115 were to specify a fourth dimension for dataset 307A that was not indicated as being a compatible dimension for dataset 307N (by metadata 119), QC module 116 may generate and return an error indicating that translation of query 115 cannot be performed. In this way, QC module 116 may limit translation of query 115 to only those instances where compatible dimensions have been clearly defined in metadata 119.

In the example of FIG. 4, a dataset 407A is joined with a dataset 407N, both of which may represent examples of datasets 107 shown in the example of FIG. 1. A data analytics specialist and/or a client may define dataset 407A and dataset 407N as follows:

```
Users:[app, is_testing_user, user_count]compatible dimensions:
[is_testing_device]
Device_crashes:[app, is_testing_device, crash_count] compatible
dimensions: [is_testing_user]
```

In this example, dataset 407A is named "Users" and has three dimensions denoted as "app," "is_testing_user," and "user_count" that each represent a separate column in dataset 407A. Dataset 407N is named "Device_crashes" in this example and has three dimensions denoted as "app," "is_testing_device," and "crash_count" that each represent a separate column in dataset 407N. QC module 116 may maintain this information as part of metadata 119 (where the above definition may also be defined in DB schema 105). Metadata 119 stored local to frontend server 102 and maintained by QC module 116 separate from DB schema 105 may further indicate a compatible dimension denoted as "is_testing_device" which references the "is_testing_device" dimension (or, in other words, column) of "Device_crashes" dataset 407N. Metadata 119 also identifies a compatible dimension of "Users" dataset 407A for dataset 407N as the "is_testing_user" dimension of dataset 407A.

UI module 114 may receive a query 115 from client computing device 108, where query 115 sets forth the following:

```
SELECT app, SUM(crash_count) / SUM(user_count)
FROM virtual_table
WHERE NOT is_testing_user and NOT is_testing_device
GROUP BY 1;
```

In this example, query 115 references (using the "SELECT" command) the common "app" dimension from both dataset 407A and dataset 407N, and (using the "WHERE NOT" and "NOT" commands) the inconsistent "is_testing_user" dimension and the inconsistent "is_testing_device", which is included in dataset 407A but excluded from dataset 407N (for the "is_testing_user" dimension) and included in dataset 407N but excluded from dataset 407A (for the "is_testing_device" dimension). Responsive to receiving query 115, UI module 114 may invoke QC module 116.

QC module 116 may translate query 115 based on metadata 119 to obtain structured query 117, where structured query 117 may define a JOIN between dataset 407A and dataset 407N over the "app" dimension, excluding the "is_testing_user" dimension and the "is_testing_device" dimension from the layered JOIN set forth in structured query 117 below given that metadata 119 indicates that "is_testing_user" and "is_testing_device" are compatible dimensions.

```
SELECT app, SUM(crash_count) / SUM(user_count)
FROM (
SELECT app, user_count FROM users WHERE NOT is_testing_user )
JOIN (
SELECT app, device_count FROM device_crashes WHERE NOT
is_testing_device
) USING(app)
GROUP BY 1;
```

The foregoing effectively implements an implicit JOIN operation across inconsistent datasets 407A and 407N that facilitates filtering of various rows of data (those rows of dataset 407A where is_testing_user is set to TRUE and those rows of dataset 407N where is_testing_device is set to TRUE), providing a virtual table 409 in which a dimension "non-testing crashes per user" are computed by the common "app" dimension and excluding the above noted rows in the sum of "user_count" and "crash_count" respectively.

FIG. 5 is a flowchart illustrating example operation of the database management system of FIG. 1 in performing various aspects of the implicit JOIN techniques described in this disclosure. As described above, QC module 114 of frontend server 102 may represent an interface (possibly in combination with UI module 114) configured to receive query 115 for accessing at least some portion of dataset 107A and at least some portion of dataset 107N (500). Query 115 may identify (e.g., as a select) two or more dimensions of datasets 107A and 107N. In the example above, dataset 107A includes a first dimension ("tracking period") of the two or more dimensions identified by query 115, while dataset 107N includes a second dimension ("active users") of the two or more dimensions identified by query 115 and excludes the first dimension of the two or more dimensions identified by query 115.

QC module 114 may translate query 115 into structured query 117 that conforms to a database query language, such as SQL (502). Structured query 117 may define a JOIN between dataset 107A and 107B over the second dimension of the two or more dimensions identified by query 115 (and not the first inconsistent dimension of the two or more dimensions). Metadata 119 may identify the first dimension of dataset 107A as being compatible with dataset 107N, which authorizes QC module 114 to formulate the JOIN command as structured query 117 while refraining from specifying the first dimension as part of the JOIN command represented at least in part by structured query 117. QC module 117 may output or otherwise transmit structured query 117 to database server 104 (504), which may access the underlying database storing datasets 107A and 107B hosted by distributed storage system 106.

The result of structured query 117 may be what is referred to as a "view" in SQL, which may represent a so-called virtual table that is specified as an operation (e.g., JOIN command) and computed in near real-time each time the virtual table is accessed (to reduce storage consumption). Views may be resolved and stored separately to potentially improve access speeds but at the cost of additional storage consumption. In any event, database server 104 may perform the JOIN command set forth by structured query 117 and return an indication that the virtual table was created that combines dataset 107A and dataset 107N over the second dimension of dataset 107N. As such, QC module 116 may receive the indication that the virtual table was created that combines dataset 107A and dataset 107N over the second dimension of dataset 107N (506).

In this way, QC module 116 acts as a software shim to adapt translation of query 115 based on metadata 119 to form structured query 117 that includes what may be referred to as an implicit JOIN operation. The JOIN operation is implicit because QC module 116 infers which dimensions to "ignore" (or, in other words, refrain from including in the JOIN operation) based on the compatible dimension set forth in metadata 119. QC module 116 thereby intercepts improper JOIN operations that would otherwise result in a JOIN between two datasets having incompatible dimensions, and adapts translation (or in other words compilation)

to implicitly form a JOIN operation along compatible dimensions that results in data broadcast (which may introduce inconsistencies) while also potentially resulting in aggregate data that may be useful in spotting trends or otherwise form the basis for decision making.

In this way, various aspects of the techniques may enable the following examples.

Example 1. A database system comprising: an interface configured to receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; and one or more processors configured to: translate the query into one or more structured queries that each conforms to a database query language, wherein a structured query of the one or more structured queries defines a join between the first dataset and the second dataset over the second dimension of the second dataset; transmit the structured query to a database that stores the first dataset and the second dataset; and receive, responsive to the structured query, an indication
       that a virtual table was created that combines the first
       dataset and the second dataset over the second dimension of the second dataset.

Example 2. The database system of example 1, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

Example 3. The database system of any combination of examples 1 and 2, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

Example 4. The database system of any combination of examples 1-3, wherein the one or more processors are configured to store metadata identifying the second dataset as having the first dimension of the first dataset as a compatible dimension with the second dataset, and wherein the one or more processors are configured, when
       configured to translate the query, to refrain from specifying, based on the metadata identifying the second
       dataset as having the first dimension of the first dataset
       as the compatible dimension with the second dataset,
       the structured query that defines the join as including
       the first dimension of the first dataset.

Example 5. The database system of example 4, wherein the metadata is stored separate from a dataset schema defining the second dataset in the database.

Example 6. The database system of any combination of examples 1-5, wherein the first dataset includes a third dimension of the two or more dimensions identified by the query, wherein the second dataset excludes the third dimension of the two or more dimensions, wherein the one or more processors are configured to store metadata identifying the second dataset as having the first dimension of the first dataset as a compatible dimension with the second dataset but not the third dimension as a compatible dimension with the second dataset, and wherein the one or more processors are configured, when configured to translate the query, to: determine, based on the metadata, that the third dimension of the first dataset is not the compatible dimension with the second dataset; and generate, based on determining that the third dimension of the first dataset is not the compatible dimension with the second dataset, an error indicating that translation of the query cannot be performed.

Example 7. The database system of any combination of examples 1-6, wherein the database query language includes a structured query language.

Example 8. A method comprising: receiving a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; translating the query into one or more structured queries that each conforms to a database query language, wherein a structured query of the one or more structured queries defines a join between the first dataset and the second dataset over the second dimension of the second dataset; transmitting the structured query to a database that stores the first dataset and the second dataset; and receiving, responsive to the structured query, an indication that a virtual table was created that combines the first dataset and the second dataset over the second dimension of the second dataset.

Example 9. The method of example 8, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

Example 10. The method of any combination of claims 8 and 9, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

Example 11. The method of any combination of claims 8-10, further comprising: storing metadata identifying the second dataset as having the first dimension of the first dataset as a compatible dimension with the second dataset, and wherein translating the query comprises refraining from specifying, based on the metadata identifying the second dataset as having the first dimension of the first dataset as the compatible dimension with the second dataset, the structured query that defines the join as including the first dimension of the first dataset.

Example 12. The method of example 11, wherein the metadata is stored separate from a dataset schema defining the second dataset in the database.

Example 13. The method of any combination of examples 8-12, wherein the first dataset includes a third dimension of the two or more dimensions identified by the query, wherein the second dataset excludes the third dimension of the two or more dimensions, wherein the method further comprises storing metadata identifying the second dataset as having the first dimension of the first dataset as a compatible dimension with the second dataset but not the third dimension as a compatible dimension with the second dataset, and wherein translating the query comprises: determining, based on the metadata, that the third dimension of the first dataset is not the compatible dimension with the second dataset; and generating, based on determining that the third dimension of the first dataset is not the compatible dimension with the second dataset, an error indicating that translation of the query cannot be performed.

Example 14. The method of any combination of examples 8-13, wherein the database query language includes a structured query language.

Example 15. A non-transitory computer-readable storage media having stored thereon instructions that, when executed, cause one or more processors to: receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; translate the query into one or more structured queries that each conforms to a database query language, wherein a structured query of the one or more structured queries defines a join between the first dataset and the second dataset over the second dimension of the second dataset; transmit the structured query to a database that stores the first dataset and the second dataset; and receive, responsive to the structured query, an indication that a virtual table was created that combines the first dataset and the second dataset over the second dimension of the second dataset.

Example 16. The non-transitory computer-readable storage media of example 15, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

Example 17. The non-transitory computer-readable storage media of any combination of examples 15 and 16, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

Example 18. The non-transitory computer-readable storage media of any combination of example 15-17, wherein the instructions further cause, when executed, the one or more processors to store metadata identifying the second dataset as having the first dimension of the first dataset as a compatible dimension with the second dataset, and wherein the instructions that, when executed cause the one or more processors to translate the query comprises instructions that, when executed cause the one or more processors to refrain from specifying, based on the metadata identifying the second dataset as having the first dimension of the first dataset as the compatible dimension with the second dataset, the structured query that defines the join as including the first dimension of the first dataset.

Example 19. The non-transitory computer-readable storage media of example 18, wherein the metadata is stored separate from a dataset schema defining the second dataset in the database.

Example 20. The non-transitory computer-readable storage media of any combination of example 15-19, wherein the first dataset includes a third dimension of the two or more dimensions identified by the query, wherein the second dataset excludes the third dimension of the two or more dimensions, wherein the instructions further comprise instructions that, when executed, cause the one or more processors to store metadata identifying the second dataset as having the first dimension of the first dataset as a compatible dimension with the second dataset but not the third dimension as a compatible dimension with the second dataset, and wherein the instructions that, when executed, cause the one or more processors to translate the query comprise instructions that, when executed, cause the one or more processors to: determine, based on the metadata, that the third dimension of the first dataset is not the compatible dimension with the second dataset; and generate, based on determining that the third dimension of the first dataset is not the compatible dimension with the second dataset, an error indicating that translation of the query cannot be performed.

Example 21. The non-transitory computer-readable storage media of any combination of example 15-20, wherein the database query language includes a structured query language.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The computing device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

One or more aspects of the techniques may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A database system comprising:

an interface configured to receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions; and one or more processors configured to:

store metadata identifying the second dataset as having the first dimension of the first dataset as a compatible dimension with the second dataset;

translate the query into one or more structured queries that each conforms to a database query language, wherein a structured query of the one or more structured queries defines a join between the first dataset and the second dataset over the second dimension of the second dataset, wherein the one or more processors are configured, when configured to translate the query, to refrain from specifying, based on the metadata identifying the second dataset as having the first dimension of the first dataset as the compatible dimension with the second dataset, the structured query that defines the join as including the first dimension of the first dataset;

transmit the structured query to a database that stores the first dataset and the second dataset; and receive, responsive to the structured query, an indication that a virtual table was created that combines the first dataset and the second dataset over the second dimension of the second dataset, wherein the structured query causes the database to broadcast the second dataset only across the compatible dimension identified by the metadata.

2. The database system of claim 1, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

3. The database system of claim 1, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

4. The database system of claim 1, wherein the metadata is stored separate from a dataset schema defining the second dataset in the database.

5. The database system of claim 1, wherein the first dataset includes a third dimension of the two or more dimensions identified by the query, wherein the second dataset excludes the third dimension of the two or more dimensions, wherein the one or more processors are configured to store metadata identifying the second dataset as having the first dimension of the first dataset as a compatible dimension with the second dataset but not the third dimension as a compatible dimension with the second dataset, and wherein the one or more processors are configured, when configured to translate the query, to:

determine, based on the metadata, that the third dimension of the first dataset is not the compatible dimension with the second dataset; and generate, based on determining that the third dimension of the first dataset is not the compatible dimension with the second dataset, an error indicating that translation of the query cannot be performed.

6. The database system of claim 1, wherein the database query language includes a structured query language.

7. A method comprising:

receiving a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions;

storing metadata identifying the second dataset as having the first dimension of the first dataset as a compatible dimension with the second dataset;

translating the query into one or more structured queries that each conforms to a database query language, wherein a structured query of the one or more structured queries defines a join between the first dataset and the second dataset over the second dimension of the second dataset, wherein translating the query comprises refraining from specifying, based on the metadata identifying the second dataset as having the first dimension of the first dataset as the compatible dimension with the second dataset, the structured query that defines the join as including the first dimension of the first dataset;

transmitting the structured query to a database that stores the first dataset and the second dataset; and receiving, responsive to the structured query, an indication that a virtual table was created that combines the first dataset and the second dataset over the second dimension of the second dataset, wherein the structured query causes the database to broadcast the second dataset only across the compatible dimension identified by the metadata.

8. The method of claim 7, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

9. The method of claim 7, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

10. The method of claim 7, wherein the metadata is stored separate from a dataset schema defining the second dataset in the database.

11. The method of claim 7, wherein the first dataset includes a third dimension of the two or more dimensions identified by the query, wherein the second dataset excludes the third dimension of the two or more dimensions, wherein the method further comprises storing metadata identifying the second dataset as having the first dimension of the first dataset as a compatible dimension with the second dataset but not the third dimension as a compatible dimension with the second dataset, and wherein translating the query comprises:

determining, based on the metadata, that the third dimension of the first dataset is not the compatible dimension with the second dataset; and generating, based on determining that the third dimension of the first dataset is not the compatible dimension with the second dataset, an error indicating that translation of the query cannot be performed.

12. The method of claim 7, wherein the database query language includes a structured query language.

13. A non-transitory computer-readable storage media having stored thereon instructions that, when executed, cause one or more processors to:

receive a query for accessing at least some portion of a first dataset and at least some portion of a second dataset, wherein the query identifies two or more dimensions of the first dataset and the second dataset, wherein the first dataset includes at least a first dimension of the two or more dimensions, and the second dataset includes a second dimension of the two or more dimensions and excludes the first dimension of the two or more dimensions;

store metadata identifying the second dataset as having the first dimension of the first dataset as a compatible dimension with the second dataset;

translate the query into one or more structured queries that each conforms to a database query language, wherein a structured query of the one or more structured queries defines a join between the first dataset and the second dataset over the second dimension of the second dataset, wherein the instructions that, when executed cause the one or more processors to translate the query comprise instructions that, when executed cause the one or more processors to refrain from specifying, based on the metadata identifying the second dataset as having the first dimension of the first dataset as the compatible dimension with the second dataset, the structured query that defines the join as including the first dimension of the first dataset;

transmit the structured query to a database that stores the first dataset and the second dataset; and receive, responsive to the structured query, an indication that a virtual table was created that combines the first dataset and the second dataset over the second dimension of the second dataset, wherein the structured query causes the database to broadcast the second dataset only across the compatible dimension identified by the metadata.

14. The non-transitory computer-readable storage media of claim 13, wherein the first dataset includes a third dimension that is the same as the second dimension of the second dataset, and wherein the structured query of the one or more structured queries defines the join between the first dataset and the second dataset using the third dimension of the first dataset and the second dimension of the second dataset.

15. The non-transitory computer-readable storage media of claim 13, wherein the first dataset includes a third dimension that is the same as the second dimension of the second dataset, and wherein the structured query of the one or more structured queries defines the join between the first dataset and the second dataset only using the third dimension of the first dataset and the second dimension of the second dataset.

16. The non-transitory computer-readable storage media of claim 13, wherein the metadata is stored separate from a dataset schema defining the second dataset in the database.

17. The non-transitory computer-readable storage media of claim 13, wherein the first dataset includes a third dimension of the two or more dimensions identified by the query, wherein the second dataset excludes the third dimension of the two or more dimensions, wherein the instructions further comprise instructions that, when executed, cause the one or more processors to store metadata identifying the second dataset as having the first dimension of the first dataset as a compatible dimension with the second dataset but not the third dimension as a compatible dimension with the second dataset, and wherein the instructions that, when executed, cause the one or more processors to translate the query comprise instructions that, when executed, cause the one or more processors to:

determine, based on the metadata, that the third dimension of the first dataset is not the compatible dimension with the second dataset; and generate, based on determining that the third dimension of the first dataset is not the compatible dimension with the second dataset, an error indicating that translation of the query cannot be performed.

* * * * *